Feb. 8, 1966  C. E. STRAIN ETAL  3,233,704
BRAKE DISC AND HUB MOUNTING MEANS
Filed June 26, 1962

INVENTORS
CHARLES E. STRAIN
ORLAND L. SCHRAM
BY Tom Walker
ATTORNEY

United States Patent Office 3,233,704
Patented Feb. 8, 1966

3,233,704
BRAKE DISC AND HUB MOUNTING MEANS
Charles E. Strain, Union, Ohio, and Orland L. Schram, Columbus, Ind., assignors to The Reliance Electric & Engineering Company, Cleveland, Ohio, a corporation of Ohio
Filed June 26, 1962, Ser. No. 205,423
3 Claims. (Cl. 188—71)

This invention relates to disc brake, friction clutch and like assemblies wherein one or more friction discs are mounted on a common hub in a rotary driven relation thereto.

The object of the invention is to simplify the construction as well as the means and mode of operation of friction brakes, whereby such brakes may not only be economically manufactured, but will be more efficient and satisfactory in use, adaptable to a wide variety of applications, and be unlikely to get out of order.

A further object of the invention is to reduce noise in assemblies as described due to rattle of discs on the hub caused by cyclic torque pulsations or the like.

Another object of the invention is to reduce resistance and noise due to rubbing when the assembly is operated in a vertical position.

A further object of the invention is to maintain the disc and hub means continuously engaged in a rotary driving-driven relation by continuing and automatic wear compensation.

Still another object of the invention is to eliminate the necessity of a close hand fitting of the disc or discs on the hub.

A still further object of the invention is to provide a disc assembly as described in which the structure functions as an air pump, forcing air between the discs in the operation of the assembly whereby to provide cooling, and, in the case of brake constructions, to separate the discs in a manner to reduce drag and to eliminate the need for separators.

A still further and specific object of the invention is to accomplish a reduction in disc rattle as described with no increase in brake loss and minimum increase in cost.

A further object of the invention is to provide a friction brake possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a plan view of a friction disc and hub constructed and assembled in accordance with the illustrated embodiment of the invention;

Like parts are indicated by similar characters of reference throughout the several views.

Figure 5:
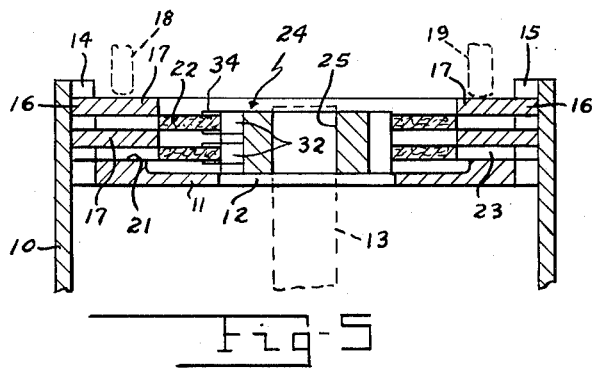
FIG. 5 is a view in cross-section, and partly diagrammatic, of a disc brake mechanism utilizing disc mounting and driving means in accordance with the instant invention.

Referring to the drawing, the invention is here disclosed as embodied in a disc brake which may, for example, assume a structural form as indicated in FIG. 5. Thus, and as shown therein, a relatively stationary housing 10 is formed intermediate its ends with a transverse partition wall 11. In the center of wall 11 is an opening 12 through which extends from one end of the housing 10 a rotary driving shaft 13 which may, for example, be the driven shaft of an electric motor, with the instant disc assembly serving as a brake therefor. At its periphery the partition wall 11 is intersected by a pair of diametrically opposed grooves 14 and 15 extending longitudinally to the opposite end of the housing 10 or that end opposite the one receiving shaft 13.

The grooves 14 and 15 are adapted to receive diametrically opposed tongues 16 on separator rings 17 of the disc brake assembly. The rings are supplied in suitable, appropriate number, there being an outermost ring adapted to be engaged by pressure applying studs 18 and 19 selectively operable to press the disc brake assembly downward to a seat on an annular land 21 on the partition wall 11. Also comprised in the disc brake assembly, in alternating relation to the rings 17, are discs 22 made of friction material and having peripheral slots 23.

The discs 22 have a common mounting on a hub 24, being connected thereto for conjoint rotary and relative longitudinal motions, as will hereinafter more clearly appear. Further, the hub 24 has a central through opening 25 adapted to receive the shaft 13 and to be keyed thereto. Rotation of the shaft 13 accordingly drives hub 24 in a rotary sense and so correspondingly rotates the friction discs 22. In the absence of pressure applied through the studs 18 and 19 the discs 22 tend to turn freely in the assembly. In the presence of such applied pressure, however, the separator rings 17 and stationary land 21 cooperate to exert a clamping pressure upon the friction discs with a consequent braking action upon shaft 13. The brake accordingly is activated or applied by inward thrust of the studs 18 and 19, as seen in FIG. 5, and is deactivated or released by a backing off of these studs.

Figure 1:
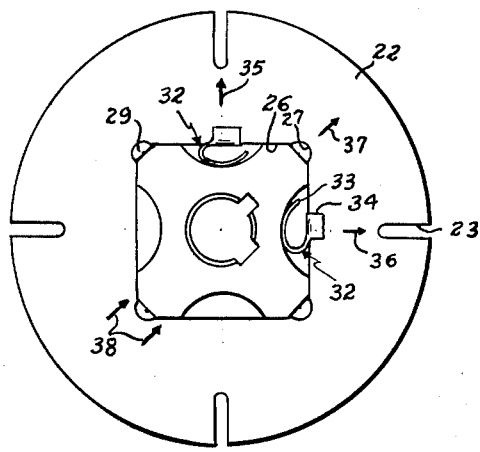
Figure 4:
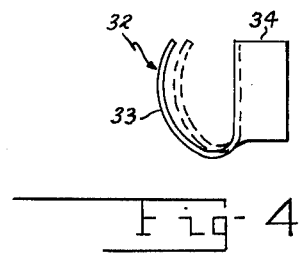
FIG. 4 is a detail view in side elevation of a spring element comprised in the assembly of FIG. 1.
Figure 3:
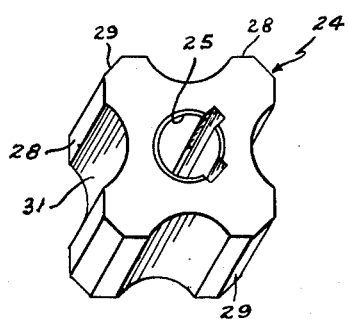
FIG. 3 is a view in perspective of the hub member of FIG. 1.
Figure 2:
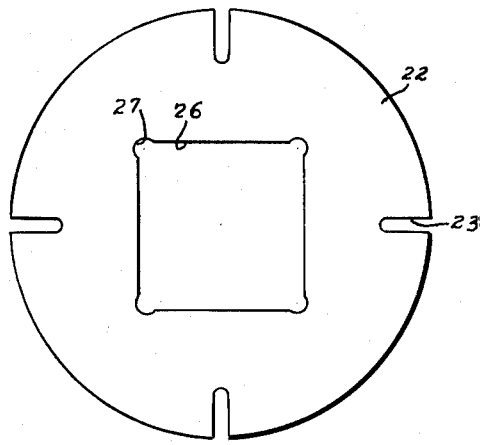
FIG. 2 is a detail plan view of the friction disc of FIG. 1.
Figure 6:
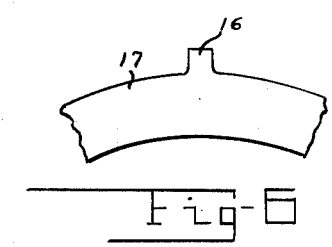
FIG. 6 is a fragmentary detail view of a separator ring comprised in the brake mechanism of FIG. 5.

As shown in FIGS. 1 and 2, each friction disc 22 is, in addition to the peripheral slots 23, formed with a central opening 26 of generally square outline, the corners 27 thereof being recessed. The discs 22 fit over the hub 24, with opening 26 in conforming, generally loosely fitting relation to the periphery of the hub. The latter thus has a square-like configuration corresponding to that of disc opening 26, the two defining nearly like parallelograms. Parallel, generally planar sides 28 of the hub achieve a substantially mating contact with corresponding opposing side edges of the disc openings 26. The corners of the hub 24 are cut away to define bevel surfaces 29. Additionally there is formed in each side surface 28 of the hub member a curved recess 31 of longitudinal extent, the recess opening through both ends of the hub member. The recesses 31 serve as cavities, selected ones thereof receiving expansion springs 32. Each spring 32 comprises a curved blade portion 33 adapted to seat in a respective recess 31 and terminating in a relatively broad base portion which is turned over in an angle configuration to mount on the facing or opposing edge of disc opening 26. The result is to introduce continuously acting biasing means between the periphery of the hub member and each disc 22. There is, in this connection, separate sets of springs 32 for each disc 22, the springs at corresponding locations on each disc seating in a corresponding cavity of recess 31.

As indicated, a pair of the springs 32 is used in connection with each disc 22, the springs being positioned approximately 90° apart to engage in respective recesses 31 in adjoining sides of the hub member 24. In reacting against the relatively stationary hub member, the springs urge their respective discs bodily outward in a lateral or radial sense, each spring exerting individual thrusts along respective lines as indicated by the arrows 35 and 36. The result is to produce an intermediate resultant force on the disc in the direction indicated by the arrow 37. The arrangement accordingly is one to urge one corner area of the disc continuously and yieldingly against corresponding faces of the hub member 24, this action occurring at a location diametrically opposed to arrow 37 or as indicated by the pair of arrows 38. At the indicated location, therefore, the hub member 24 has a portion in close interfitting relation with the discs 22 in a manner to drive the discs rotatively without lost motion either in the starting or stopping of the rotary movement.

The construction of hub member 24 with four equally, spaced recesses 31 provides for selectivity in the placement of the springs 32 as well as the differential positioning of the hub member as may be required by wear or the necessities of assembly. Also, it facilitates the relative angular placement of the springs of adjacent discs should this be desirable in the interests of improved balance and reduced wear on the hub member. The construction and results afforded are productive of advantages as heretofore set out. Thus, brake noise due to rattle of the discs on the hub is obviated. Wear between the disc and hub is compensated for since the springs 32 continuously maintain the desired driving-driven relationship irrespective of wear. Also, the necessity of a close hand fitting of the disc on the hub is obviated, the need for precision machining to insure a close fit being similarly avoided. The springs enable easy sliding movements of the discs on the hub while at the same time maintaining the described radial wedging action inhibiting rattle.

The recesses 31, as well as the recessed corners 27 in the discs provide air flow passages through the brake disc assembly. These passages communicate within the disc assembly with the spaces between adjacent discs and rings. In the rotation of the hub member 24 and connected parts these passages and communicating spaces become flow passes for air, the brake structure acting as a pump in the operation of the motor to force air between and around the disc and ring elements. This air flow has a cooling effect upon the elements of the brake. Also, however, it tends to separate the disc and ring elements, providing an air cushion therebetween. Accordingly, noise due to disc rub when the motor and brake shaft is in a vertical position is obviated and drag caused by disc and separator plate contact similarly is reduced when brake is in the running or released position. The need for spacers or separators between disc elements is eliminated.

The invention is disclosed as embodied in a disc brake or the like comprised of multiple friction discs. The invention may be complete, however, in an assembly comprised of a hub and only a single disc thereon.

From the above description it will be apparent that there is thus provided a device of the character described possessing the particular features of advantage before enumerated as desirable, but which obviously is susceptible of modification in its form, proportions, detail, construction and arrangement of parts without departing from the principle involved or sacrificing any of its advantages.

While in order to comply with the statute the invention has been described in language more or less specific as to structural features, it is to be understood that the invention is not limited to the specific feautres shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. In a disc brake or the like having at least one friction disc, a hub member of angular peripheral configuration, said disc having a central opening receiving said hub member, said hub and said disc having interfitting portions providing for a conjoint rotation thereof, with no lost motion therebetween, and angularly spaced blade type spring elements respectively seated in selective recesses in said hub member, said spring elements being contoured to the form of said recesses and mounted to press against the opposing edge of the central opening in said disc and urge said disc bodily to maintain a relatively fixed engagement of said interfitting portions of said hub member and said disc.

2. In a disc brake or the like having at least one friction disc, a hub member having a peripheral outline in the form of a parallelogram mounting said disc, said disc having an opening of corresponding shape receiving said hub member, adjoining sides of said hub member each having an arcuate recess therein, said recesses being at right angles to one another, and an expansion spring having an arcuate blade portion seated in each of said recesses and a base portion bearing against an opposing edge of said disc opening to relatively fix the hub member and said disc so as to preclude their relative rotation.

3. In a disc brake or the like comprising alternating friction disc and separator ring means, a hub member on which said disc means is mounted for conjoint rotary and relative longitudinal motion, said hub member being peripherally recessed in a longitudinal sense at positions 90° apart and blade spring means installed in the peripherally recessed hub member, 90° apart, stressing said disc means bodily in a lateral sense, the rotation of said hub member during an inoperative condition of said brake producing a pumping of air through the recesses in said hub member and inducing a relative separation of said disc and ring means, said spring means being so formed to provide for a relatively free longitudinal motion of said discs relative said hub.

References Cited by the Examiner

UNITED STATES PATENTS

| | | | |
|---|---|---|---|
| 1,142,817 | 6/1915 | Kirk | 267—1 |
| 1,265,911 | 5/1918 | Henderson | 188—26 |
| 1,461,573 | 7/1923 | Browne | 192—64 |
| 1,813,209 | 7/1931 | Spase | 64—27 |
| 2,244,169 | 6/1941 | Miller | 192—69 X |
| 2,724,252 | 11/1955 | Schmal | 64—27 |

FOREIGN PATENTS

| | | |
|---|---|---|
| 204,425 | 11/1908 | Germany. |
| 681,145 | 9/1939 | Germany. |
| 501,580 | 11/1954 | Italy. |
| 579,221 | 7/1959 | Canada. |

MILTON BUCHLER, *Primary Examiner.*

ABRAHAM G. STONE, EUGENE G. BOTZ, ARTHUR L. LA POINT, *Examiners.*

T. B. HENRY, G. HALVOSA, D. A. REGER,
*Assistant Examiners.*